(12) United States Patent
Lee et al.

(10) Patent No.: US 11,542,854 B2
(45) Date of Patent: Jan. 3, 2023

(54) APPARATUS FOR CONTROLLING ENGINE AND METHOD THEREOF

(71) Applicants: HYUNDAI MOTOR COMPANY, Seoul (KR); KIA MOTORS CORPORATION, Seoul (KR)

(72) Inventors: Su Ho Lee, Suwon-si (KR); Gun Ku Lee, Gyeonggi-do (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 95 days.

(21) Appl. No.: 17/091,211

(22) Filed: Nov. 6, 2020

(65) Prior Publication Data

US 2022/0042445 A1 Feb. 10, 2022

(30) Foreign Application Priority Data

Aug. 5, 2020 (KR) .......................... 10-2020-0098165

(51) Int. Cl.
*F01P 7/16* (2006.01)
*F16H 59/70* (2006.01)
(Continued)

(52) U.S. Cl.
CPC ................ *F01P 7/16* (2013.01); *F16H 59/70* (2013.01); *F01P 2007/146* (2013.01);
(Continued)

(58) Field of Classification Search
CPC .... F01P 7/16; F01P 7/165; F01P 7/167; F01P 3/02; F01P 2007/146; F01P 2025/08;
(Continued)

(56) References Cited

U.S. PATENT DOCUMENTS 6,101,987 A * 8/2000 Saur ........................ F01P 7/048
123/41.1
8,925,512 B2 * 1/2015 Kitada ...................... F01P 3/00
123/193.5
(Continued)

FOREIGN PATENT DOCUMENTS

JP 2003-328756 A 11/2003
JP 2004-156490 A 6/2004
(Continued)

*Primary Examiner* — Grant Moubry
(74) *Attorney, Agent, or Firm* — Lempia Summerfield Katz LLC

(57) ABSTRACT

An engine control apparatus and an engine control method for a vehicle are disclosed. The engine control apparatus includes: an integrated thermal management valve in which an opening degree of a plurality of valves is adjusted by rotation of a cam; a storage to store an opening degree of the integrated thermal management valve based on a road slope and a transmission gear value; and a controller that controls the opening degree of the integrated thermal management valve by using an engine revolutions per minute (RPM) and an accelerator pedal value. In particular, when the accelerator pedal value is smaller than a predetermined threshold, the controller controls the opening degree of the integrated thermal management valve based on the road slope and the transmission gear value.

18 Claims, 4 Drawing Sheets

Figure 1:
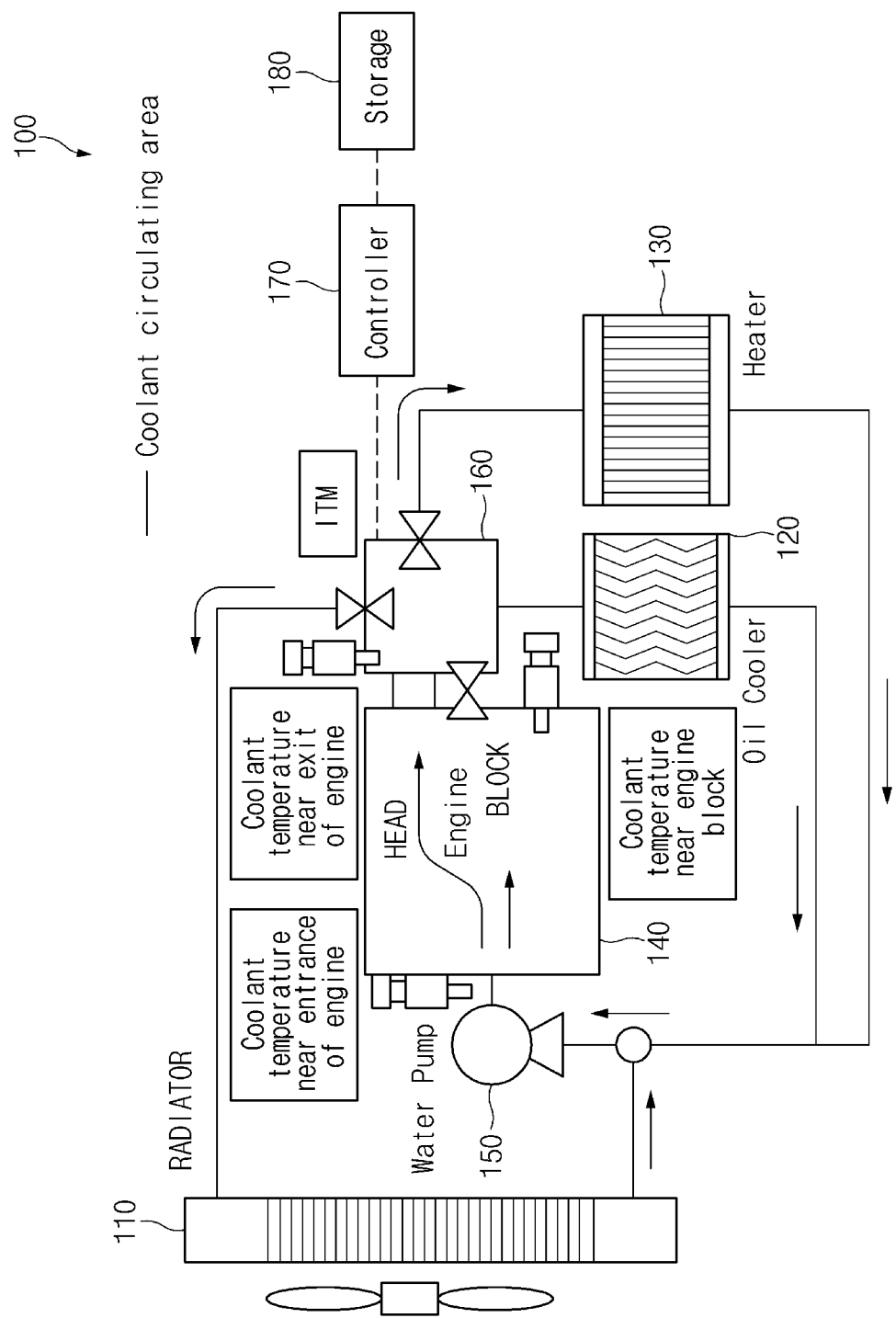

(51) Int. Cl.
  *F16H 59/66* (2006.01)
  *F01P 7/14* (2006.01)
(52) U.S. Cl.
  CPC ....... *F01P 2025/08* (2013.01); *F01P 2025/64* (2013.01); *F16H 59/66* (2013.01); *F16H 2059/663* (2013.01)
(58) Field of Classification Search
  CPC .............. F01P 2025/64; F01P 2025/32; F01P 2060/08; F01P 2060/04; F16H 59/70; F16H 59/66; F16H 2059/663; F16K 31/5245; F02D 31/001; F02D 41/0225; F02D 2041/1409; F02D 2200/101; F02D 2200/602; F02D 2200/70
  See application file for complete search history.

(56) References Cited

U.S. PATENT DOCUMENTS

| | | | |
|---|---|---|---|
| 11,022,025 B1 | 6/2021 | Lee | |
| 2003/0150923 A1* | 8/2003 | Leu | G05D 23/1921 236/100 |
| 2020/0231023 A1* | 7/2020 | Sathasivam | H01M 10/633 |

FOREIGN PATENT DOCUMENTS

| | | |
|---|---|---|
| KR | 10-2021-0075698 | 6/2021 |
| KR | 10-2021-0099333 | 8/2021 |

\* cited by examiner

APPARATUS FOR CONTROLLING ENGINE AND METHOD THEREOF

CROSS-REFERENCE TO RELATED APPLICATION

This application claims priority to and the benefit of Korean Patent Application No. 10-2020-0098165, filed on Aug. 5, 2020, the entire contents of which are incorporated herein by reference.

FIELD

The present disclosure relates to an engine control apparatus and an engine control method for a vehicle, and more particularly, to a technique for controlling distribution of coolant of an engine.

BACKGROUND

The statements in this section merely provide background information related to the present disclosure and may not constitute prior art.

Vehicles are recently focusing on the development of next-generation engines and transmissions, based on three key tasks: high fuel economy, practical performance, and eco-friendliness.

Accordingly, technique application and parts development for gasoline engines and transmissions are being actively discussed in various ways, and for example, fuel economy of about 10% or more significantly improved compared to the existing gasoline model may be provided through an optimal combination of an engine and a transmission, thereby satisfying needs of customers and seeking to develop techniques that are competitive in terms of performance and durability.

Development of such vehicle engines may respond to increasing national fuel economy and environmental regulations and meet drivers' various expectations for vehicle performance, in order to achieve actual fuel economy improvement, practical performance improvement, and emission reduction.

To this end, various coolant temperature control techniques are being discussed to distribute a coolant from an integrated thermal management valve to an engine radiator, a transmission oil warmer, and a heater in an engine. d The above information disclosed in this Background section is only for enhancement of understanding of the background of the present disclosure, and therefore it may contain information that does not form the prior art that is already known to a person of ordinary skill in the art.

SUMMARY

The present disclosure provides an engine control apparatus and an engine control method for a vehicle, which are capable of controlling a cam angle of an integrated thermal management (ITM) valve using an accelerator pedal value, a road slope, and a transmission gear value when controlling opening of the integrated thermal management valve, in order to control the integrated thermal management valve to open first rather than an increase in engine revolutions per minute (RPM) caused by an engine brake during the vehicle is running under a hill descent control, thereby reducing differential pressure between front and rear ends of the integrated thermal management valve.

The technical objects of the present disclosure are not limited to the objects mentioned above, and other technical objects not mentioned can be clearly understood by those skilled in the art from the description of the claims.

In an exemplary form of the present disclosure, an engine control apparatus for a vehicle includes: an integrated thermal management valve in which an opening degree of a plurality of valves is adjusted by rotation of a cam; a storage configured to store an opening degree of the integrated thermal management valve depending on a road slope and a transmission gear value; and a controller configured to control the opening degree of the integrated thermal management valve by using an engine revolutions per minute (RPM) and an accelerator pedal value, and when the accelerator pedal value is smaller than a predetermined threshold, configured to control the opening degree of the integrated thermal management valve depending on the road slope and the transmission gear value.

In an exemplary form, the controller, when a gear value is smaller than a certain value during the vehicle is running under a hill descent control, may control the integrated thermal management valve to be opened at a predetermined angle for a predetermined time.

In an exemplary form, the controller may determine whether the road slope is smaller than a predetermined threshold slope.

In an exemplary form, the controller may determine whether the transmission gear value is smaller than a predetermined first reference value when the road slope is smaller than the predetermined threshold slope.

In an exemplary form, the controller may open the integrated thermal management valve by a first lift value when the transmission gear value is smaller than the first reference value.

In an exemplary form, the controller may determine whether the transmission gear value is smaller than a predetermined second reference value when the road slope is equal to or greater than the predetermined threshold slope.

In an exemplary form, the controller may open the integrated thermal management valve by a second lift value when the transmission gear value is smaller than the second reference value.

In an exemplary form, the controller may set the second reference value to be smaller than the first reference value.

In an exemplary form, the controller may set the second lift value to be smaller than the first lift value.

In an exemplary form, the controller may maintain an open state of the integrated thermal management valve for a predetermined time, and then controlling the opening degree of the integrated thermal management valve based on PID (proportional, integral, and differential) depending on a coolant temperature when the integrated thermal management valve is opened by the first or second lift value.

In an exemplary form, the controller, when the accelerator pedal value is greater than the predetermined threshold, may control a radiator valve of the integrated thermal management valve to be fully opened.

In another exemplary form of the present disclosure, an engine control method for a vehicle includes: controlling, by a controller, an opening degree of an integrated thermal management valve in which opening of a plurality of valves is adjusted by rotation of a cam by using an engine revolutions per minute (RPM); determining, by the controller, whether an accelerator pedal value is greater than a predetermined threshold; and controlling, by the controller, the opening degree of the integrated thermal management valve depending on a road slope and a transmission gear value when the accelerator pedal value is smaller than or equal to the predetermined threshold.

In an exemplary form, the engine control method may further include controlling, by the controller, a radiator valve of the integrated thermal management valve to be fully opened when the accelerator pedal value is greater than the predetermined threshold.

In an exemplary form, the controlling of the opening degree of the integrated thermal management valve may include when a gear value is smaller than a certain value during the vehicle is running under a hill descent control, controlling the integrated thermal management valve to be opened at a predetermined angle for a predetermined time.

In an exemplary form, the controlling of the opening degree of the integrated thermal management valve may include: determining whether a transmission gear value is smaller than a predetermined first reference value when the road slope is smaller than a predetermined threshold slope; and opening the integrated thermal management valve by a first lift value when the transmission gear value is smaller than the first reference value.

In an exemplary form, the controlling of the opening degree of the integrated thermal management valve may further include: determining whether the transmission gear value is smaller than a predetermined second reference value when the road slope is equal to or greater than the predetermined threshold slope; and opening the integrated thermal management valve by a second lift value when the transmission gear value is smaller than the second reference value.

In an exemplary form, the controlling of the opening degree of the integrated thermal management valve may further include maintaining an open state of the integrated thermal management valve for a predetermined time, and then controlling the opening degree of the integrated thermal management valve based on PID (proportional, integral, and differential) depending on a coolant temperature when the integrated thermal management valve is opened by the first or second lift value.

In an exemplary form, the engine control method may further include setting the second reference value to be smaller than the first reference value and the second lift value to be smaller than the first lift value.

According to the exemplary forms of the present disclosure, it is possible to provide an engine control apparatus and an engine control method for a vehicle, capable of controlling a cam angle of an integrated thermal management (ITM) valve using an accelerator pedal value, a road slope, and a transmission gear value when controlling opening of the integrated thermal management valve, to control the integrated thermal management valve to open first rather than an increase in engine revolutions per minute (RPM) caused by an engine brake during the vehicle is running under a hill descent control, thereby reducing differential pressure between front and rear ends of the integrated thermal management valve, and thus preventing excessive load from acting on the stem portion of the valve in advance.

In addition, various effects that can be directly or indirectly identified through this document may be provided.

Further areas of applicability will become apparent from the description provided herein. It should be understood that the description and specific examples are intended for purposes of illustration only and are not intended to limit the scope of the present disclosure.

DRAWINGS

Figure 2:
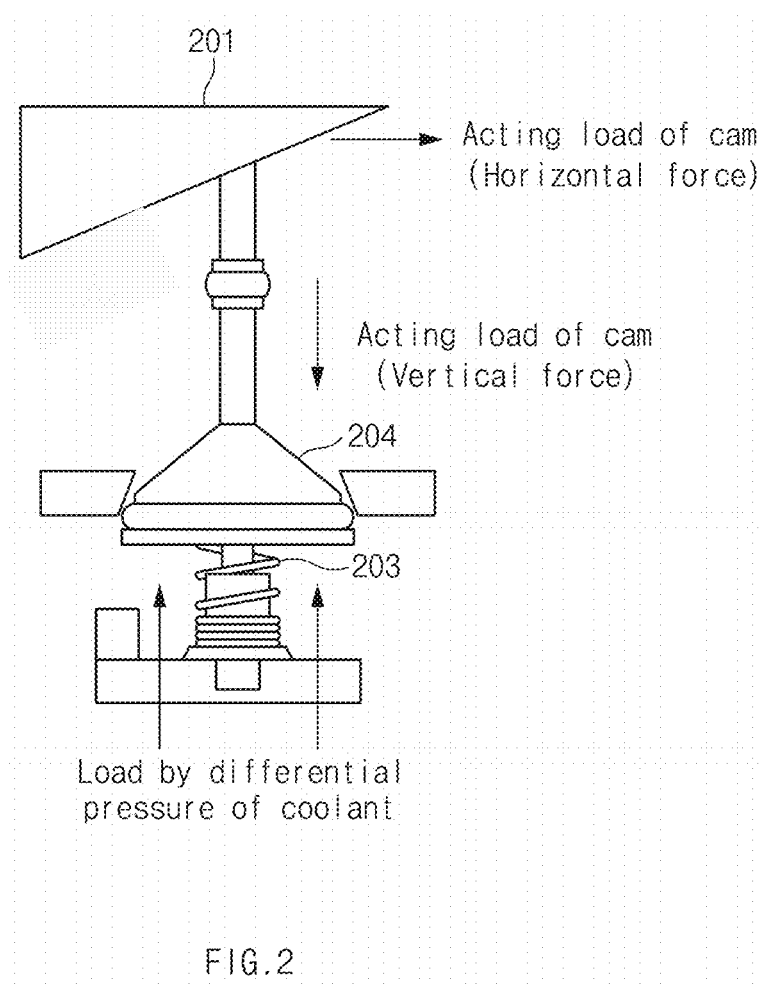
Figure 3:
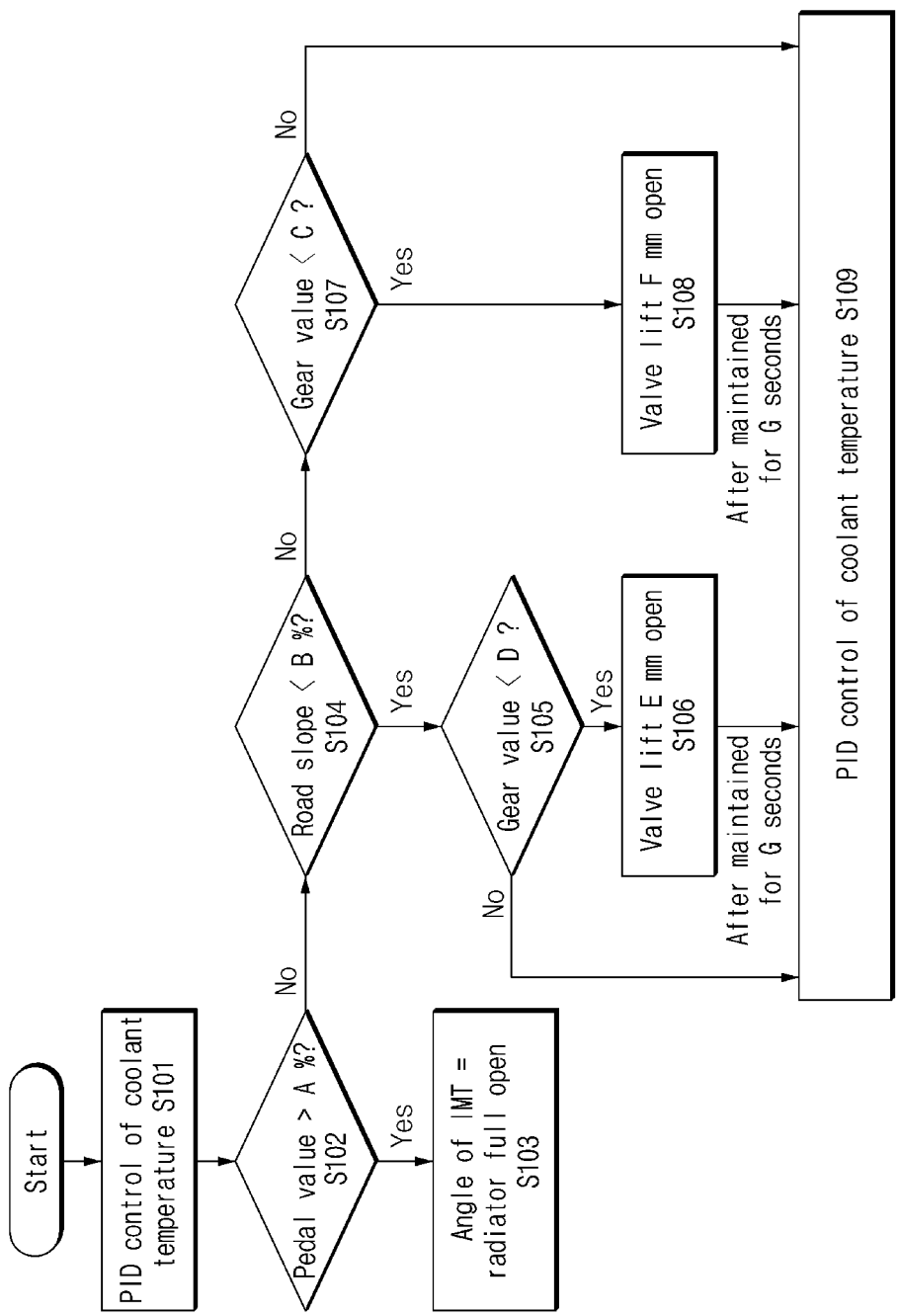
Figure 4:
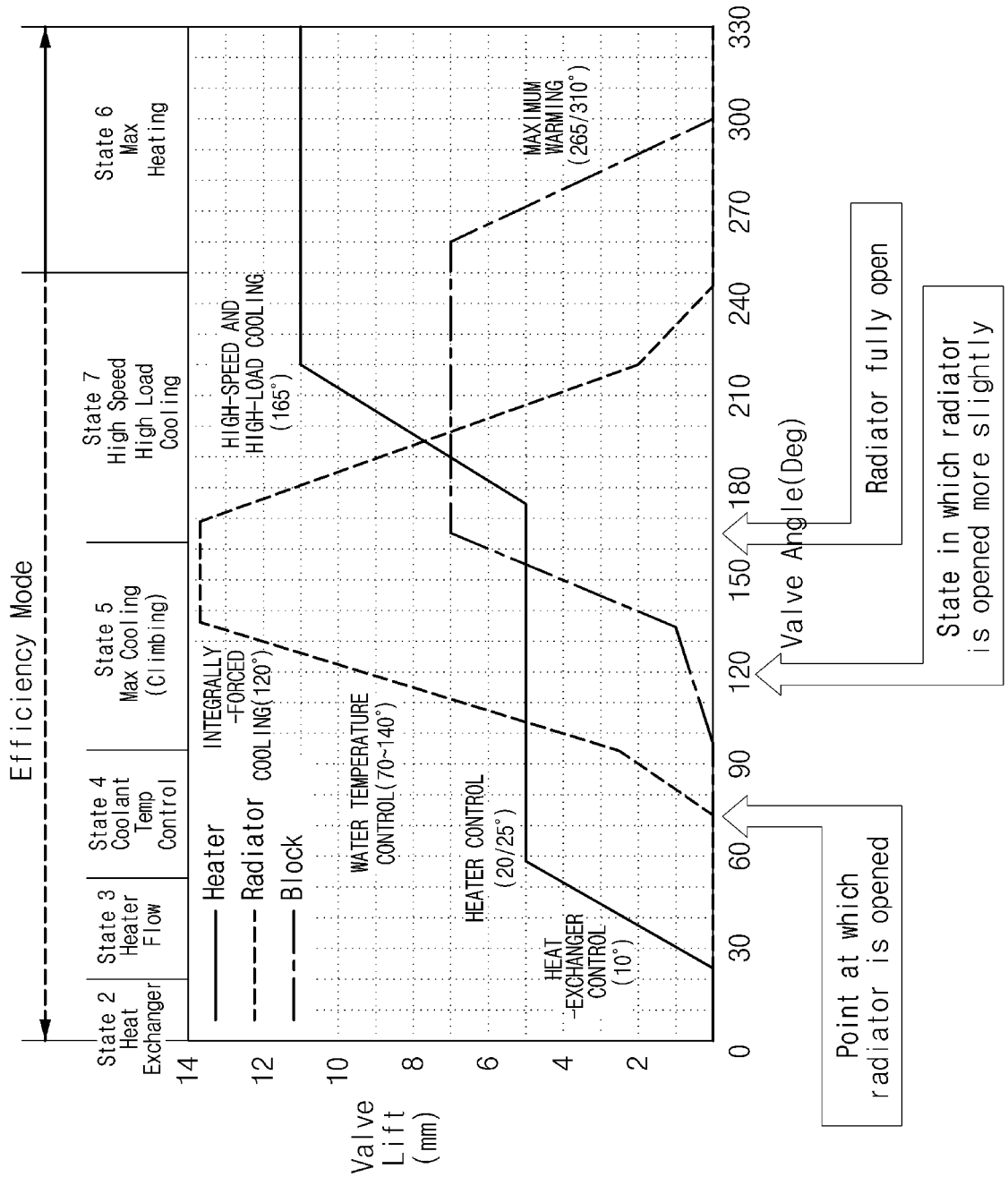

In order that the disclosure may be well understood, there will now be described various forms thereof, given by way of example, reference being made to the accompanying drawings, in which:

FIG. 1 illustrates a block diagram showing a configuration of an engine control apparatus for a vehicle according to an exemplary form of the present disclosure;

FIG. 2 schematically illustrates a structure of an integrated thermal management valve and a cam according to an exemplary form of the present disclosure;

FIG. 3 illustrates a flowchart showing a process of performing an integrated thermal management according to an example of the present disclosure; and FIG. 4 illustrates a graph showing a change in an angle of an integrated thermal management valve depending on an accelerator pedal valve according to an exemplary form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, some exemplary forms of the present disclosure will be described in detail with reference to exemplary drawings. It should be noted that in adding reference numerals to constituent elements of each drawing, the same constituent elements have the same reference numerals as possible even though they are indicated on different drawings. In addition, in describing exemplary forms of the present disclosure, when it is determined that detailed descriptions of related well-known configurations or functions interfere with understanding of the exemplary forms of the present disclosure, the detailed descriptions thereof will be omitted.

In describing constituent elements according to an exemplary form of the present disclosure, terms such as first, second, A, B, (a), and (b) may be used. These terms are only for distinguishing the constituent elements from other constituent elements, and the nature, sequences, or orders of the constituent elements are not limited by the terms. In addition, all terms used herein including technical scientific terms have the same meanings as those which are generally understood by those skilled in the technical field to which the present disclosure pertains (those skilled in the art) unless they are differently defined. Terms defined in a generally used dictionary shall be construed to have meanings matching those in the context of a related art, and shall not be construed to have idealized or excessively formal meanings unless they are clearly defined in the present specification.

Hereinafter, exemplary forms of the present disclosure will be described in detail with reference to FIG. 1 to FIG. 4.

FIG. 1 illustrates a block diagram showing a configuration of an engine control apparatus 100 according to an exemplary form of the present disclosure. In particular, FIG. 1 schematically illustrates a configuration of a cooling system according to an exemplary form of the present disclosure.

Referring to FIG. 1, an integrated thermal management (ITM) valve 160, which is a device that intelligently supplies a coolant depending on an engine temperature, may include a valve for controlling a flow of a coolant that passes toward a heat exchanger such as a radiator, a heater coil, or an oil cooler or a flow of a coolant that is introduced from a side of a cylinder head or a cylinder block. The ITM valve 160 may control the flow of the coolant by adjusting a rotation angle of the cam. In this regard, a cam/valve structure of the ITM valve in one form of the present disclosure will be briefly described below with reference to FIG. 2.

A coolant is required to discharge a heat of an engine to a radiator while circulating between the radiator and the engine in order to cool the engine, and in this case, the coolant discharged from the engine circulates through a radiator that discharges a heat of the coolant to an atmosphere through the ITM valve, a water pump for circulating the coolant, an oil cooler for cooling an engine oil, and a heater core for radiating the heat of the coolant to an interior of the vehicle.

Control logic of this ITM valve determines a PID gain value based on a difference between a target water temperature and a current water temperature, and accordingly sets a cam angle (valve open). Herein, PID indicates one of automatic control methods, and is a method of performing control by a combination of proportional, integral, and differential. The PID is used as a function for actuators, autonomous vehicles, robots, sensor value correction, and the like. A coefficient value (gain value) for each item of the PID must be properly set depending on a type of actuator that creates a physical quantity.

Herein, Table 1 shows an angle table of the ITM valve based on the PID gain value, where an X-axis represents an angle of the ITM valve (=RVC_AV), and a Y-axis represents revolutions per minute (RPM) (=N).

As shown in Table 1, an opening angle of the ITM valve is changed by 3000, 3500, and 4000 RPM. For example, when conditions that the RPM increases above 5000 or more and the ITM valve starts to open are satisfied, excessive differential pressure of a coolant between front and rear ends of the valve acts as a resistance, and an excessive load may be applied to a stem portion of the valve.

Therefore, the ITM valve may be opened early by using an accelerator pedal value before the RPM rises, so that the differential pressure between the front and rear ends of the ITM valve may increase rapidly.

That is, when the accelerator pedal value is greater than a predetermined threshold, the engine control apparatus 100 may control it to operate with 'angle of ITM valve=radiator full open', and when the accelerator pedal value is equal to or smaller than the predetermined threshold valve, the angle of the ITM valve may be adjusted depending on the RPM.

However, when a vehicle shifts to a lower gear during the vehicle is driving under a hill descent control, there may be a case where the RPM rises rapidly in 0% of the accelerator pedal value. Accordingly, when the vehicle shifts to the lower gear during the hill descent control in 0% of the pedal value (or smaller than a certain value), the ITM valve may be opened before the RPM increases by the engine brake, and thus it is possible to prevent excessive load from being applied to the stem portion of the ITM valve by reducing the differential pressure generated between the front end and the rear end of the ITM valve to a minimum.

Referring to FIG. 1, the engine control apparatus 100 includes a radiator 110, an oil cooler 120, a heater 130, an engine 140, a water pump 150, an ITM valve 160, a controller 170, and a storage 180. The ITM valve 160 may include a plurality of valves, i.e., a radiator valve, a block valve, and a heater valve, for sending a coolant to the radiator 110, oil cooler 120, heater 130, etc., and opening degrees of the valves may be controlled by the controller 170.

The storage 180 may store data acquired by the controller 170, an algorithm for driving the controller 170, and the like.

For example, the storage 180 may store engine revolutions per minute (RPM), a transmission gear value, and the like.

In addition, the storage 180 may also store an angle table of an ITM valve based on a PID gain value (for general PID control) as shown in Table 1.

In addition, the storage 180 may store a table as shown in Table 2 in which a lift value of the ITM value depending on a road slope and a transmission gear value (final gear value) is matched.

TABLE 2

| Road slope | Final gear value | | | |
|---|---|---|---|---|
| | → 2 | → 3 | → 4 | → 5 |
| −10% | 8 mm | 8 mm | 8 mm | 8 mm |
| −5% | 6 mm | 6 mm | 6 mm | |

TABLE 1

| x: PERC_RVC[%] y: N_32[rpm] | | | | | | | | | | | | |
|---|---|---|---|---|---|---|---|---|---|---|---|---|
| y⤓x | 0.000 | 2.000 | 3.999 | 6.000 | 8.000 | 10.001 | 12.000 | 14.000 | 16.000 | 20.000 | 30.000 | 39.999 |
| 3008.00 | 77.00 | 79.00 | 81.00 | 83.00 | 85.00 | 87.00 | 91.00 | 95.00 | 100.00 | 120.00 | 140.00 | 165.00 |
| 3040.00 | 85.00 | 85.00 | 90.00 | 90.00 | 95.00 | 100.00 | 105.00 | 110.00 | 115.00 | 120.00 | 140.00 | 165.00 |
| 3488.00 | 95.00 | 95.00 | 100.00 | 105.00 | 110.00 | 115.00 | 120.00 | 125.00 | 115.00 | 135.00 | 140.00 | 165.00 |
| 4000.00 | 115.00 | 115.00 | 115.00 | 120.00 | 120.00 | 125.00 | 125.00 | 130.00 | 130.00 | 135.00 | 140.00 | 165.00 |

TABLE 2-continued

| Road slope | Final gear value | | | |
|---|---|---|---|---|
| | → 2 | → 3 | → 4 | → 5 |
| 0% | 6 mm | 6 mm | 6 mm | |
| 5% | 6 mm | 6 mm | 6 mm | |

In addition, the storage 180 may store a table as shown in Table 3 in which an angle value of the ITM valve depending on the accelerator pedal value is matched.

TABLE 3

| Accelerator pedal (%) | 70.020 |
|---|---|
| Angle of ITM (°) | 165.00 |

As an example in Table 3, when the accelerator pedal value is greater than 70%, an example in which the angle of the ITM valve is 165 degrees will be disclosed.

In addition, the storage 180 may also store an angle table of an ITM valve based on a PID gain value (for general PID control) as shown in Table 1.

The controller 170 may control the opening of the ITM valve 160 based on the PID table shown in Table 1 depending on the engine revolutions per minute (RPM).

In addition, the controller 170 may control the opening of the ITM valve 160 by using the accelerator pedal value as shown in Table 2. That is, when the accelerator pedal value is greater than a predetermined threshold, the controller 170 control it to operate with 'angle of ITM valve=radiator full open', and when the accelerator pedal value is equal to or smaller than the predetermined threshold valve, the angle of the ITM valve may be adjusted depending on the RPM.

However, when a vehicle shifts to a lower gear during the vehicle is driving under the hill descent control, there may be a case where the RPM rises rapidly in 0% of the accelerator pedal value. Accordingly, when the vehicle shifts to the lower gear during the hill descent control in 0% of the pedal value (or smaller than a certain value), the ITM valve may be opened before the RPM increases by the engine brake, and thus it is possible to prevent excessive load from being applied to the stem portion of the ITM valve by reducing the differential pressure generated between the front end and the rear end of the ITM valve to a minimum.

That is, when the accelerator pedal value is smaller than a predetermined threshold, the controller 170 may control the opening degree of the ITM valve depending on the road slope and the transmission gear value, and may control the ITM valve 160 to open at a predetermined angle for a predetermined time. In this case, the road slope may indicate a value obtained by dividing an altitude difference between two arbitrary points by a linear distance between the two points. In this case, the controller 170 may acquire the road slope from a sensing device such as a radar or a G sensor, or through a navigation system.

The controller 170 may determine whether the road slope is smaller than a predetermined threshold slope (e.g., −5%), when the road slope is smaller than the predetermined threshold slope, may determine whether the transmission gear value is smaller than a predetermined first reference value (e.g., 6th-speed gear), and when the transmission gear value is smaller than the first reference value, may open the ITM valve 160 by a first lift value (e.g., 8 mm).

When the road slope is equal to or greater than the predetermined threshold slope, the controller 170 may determine whether the transmission gear value is smaller than a predetermined second reference value (e.g., speed gear), and when the transmission gear value is smaller than the second reference value, the controller 170 may open the ITM valve 160 by a second lift value (e.g., 6 mm). In this case, the second reference value may be set to be smaller than the first reference value, and the second lift value may be set to be smaller than the first lift value.

When the integrated thermal management valve 160 is opened by the first lift value or the second lift value, the controller 170 may maintain an open state of the ITM valve for a predetermined time (e.g., 5 s), and then may control the opening degree of the ITM valve 160 based on PID (proportional, integral, and differential) depending on the coolant temperature as shown in Table 1.

The controller 170 may control the opening degree by adjusting a rotation angle of the cam of the ITM valve 160.

In addition, when the accelerator pedal value is greater than a predetermined threshold, the controller 170 may control a radiator valve of the ITM valve 160 to be fully opened.

FIG. 2 schematically illustrates a structure of the integrated thermal management valve 160 and the cam according to an exemplary form of the present disclosure.

Referring to FIG. 2, a coolant flows at a lower end of the valve when a cam 201 rotates at a predetermined angle, and thus a cam of the ITM valve has a structure that prevents opening of the valve in an opposite direction to a direction of an acting load of the cam when a flow of coolant is strong. That is, when the cam 201 of the ITM valve rotates at a predetermined angle, a sloped surface of the cam presses an end of a valve 204 to open the valve, and a spring 203 serves to push the valve in an opposite direction to a direction in which the cam presses the valve. In this case, opening and closing is due to a height formed in a thickness direction of the cam.

In this case, the cam may be formed of a disk-shaped plate, and may have a shape in which a 'path' that is curved in a thickness direction of the plate of the cam may be formed such that a plurality of valves may be vertically pressed. Accordingly, as the cam rotates, a corresponding valve may be pressed along a thickness of the curved path to move up and down.

As described, the control logic of the ITM valve operates to open the valve when a coolant temperature increases to be higher than a predetermined water temperature, and to close it completely when the coolant temperature decreases to be lower than the predetermined water temperature. In this case, in the case where a moment when the radiator valve is closed and a moment when the RPM rises overlap, or when an increase rate of the RPM is faster than an opening time of the ITM valve, the differential pressure between the front and rear ends of the radiator valve may rapidly rise, causing an excessive load to act on the stem portion of the valve.

Therefore, the ITM valve may be early opened by using the engine pedal value, but the RPM may increase rapidly in 0% of the engine pedal value during the hill descent control and low gear driving, and thus the ITM valve may be opened early for a predetermined time by using the road slope and the transmission gear value during the hill descent control and the low gear driving, thereby reducing or minimizing the differential pressure between the front and rear ends of the valve to prevent excessive load from acting on the stem portion of the ITM valve.

Hereinafter, an integrated thermal management method according to an example of the present disclosure will be described with referring to FIG. 3. FIG. 3 illustrates a signal flowchart showing a process of performing an integrated thermal management according to an example of the present disclosure.

Hereinafter, it is assumed that the engine control apparatus 100 of the vehicle of FIG. 1 performs a process of FIG. 3. In addition, in the description of FIG. 3, operations described as being performed by a device may be understood as being controlled by the controller 170 of the engine control apparatus 100.

Referring to FIG. 3, the engine control apparatus 100 determines an engine coolant temperature after starting the engine and performs PID control depending on a coolant temperature (S101).

Subsequently, the apparatus 100 determines whether an accelerator pedal value is greater than a predetermined threshold A during the PID control of the coolant temperature (S102). When the accelerator pedal value is greater than the predetermined threshold A, the apparatus 100 controls it to operate with 'angle of ITM valve=radiator full open' (S103). In this case, the threshold A may be set to, e.g., 70%, which is may be predetermined and stored as an experimental value. This is because when a driver stepped on a pedal by more than a predetermined threshold (70%), it is predicted that the RPM will rise rapidly, and thus the ITM valve is controlled to move at a full opening angle in advance. Accordingly, the engine control apparatus controls it to prevent excessive load from being applied to the stem portion of the valve in advance. FIG. 4 illustrates a graph showing a change in an angle of an integrated thermal management valve depending on a value of a pedal according to an exemplary form of the present disclosure. As illustrated in FIG. 4, an angle of the ITM valve may be controlled depending on the accelerator pedal value.

However, even when the accelerator pedal value is smaller than or equal to the predetermined threshold A, the RPM may increase rapidly when the vehicle is shifting down during the vehicle is driving under the hill descent control.

Accordingly, when the excel pedal value is equal to or smaller than the predetermined threshold A, the apparatus 100 determines whether the road slope is smaller than a predetermined threshold B (S104). In this case, the threshold B may be set to, e.g., −5%, which is may be predetermined and stored as an experimental value. In this case, the road slope may have a value obtained by dividing an altitude difference between two arbitrary points by a linear distance between the two points. The road slope may be acquired through a sensor such as a radar or a G sensor, or through a navigation.

When the road slope is smaller than the predetermined threshold B, the apparatus 100 determines whether the transmission gear value is smaller than a threshold D (S105). In this case, the threshold D may be set to, e.g., 6, which is may be predetermined and stored as an experimental value.

When the transmission gear value is smaller than the threshold D, the apparatus 100 adjusts a lift value to open the ITM control valve by a predetermined value E (S106). Then, the apparatus 100 maintains an opening angle of the ITM valve by the predetermined value E for a predetermined G seconds, and then performs the PID control of the coolant temperature (S109). In this case, the threshold E may be set to, e.g., 9 mm, and G may be set to 5, and these may be predetermined and stored as an experimental value.

When conditions that the RPM increases (e.g., 4000 RPM or more) and the ITM valve starts to open are simultaneously satisfied, an excessive differential pressure of the coolant between the front and rear ends of the ITM valve acts as resistance, causing an excessive load to be applied to the stem portion of the valve. Therefore, when the accelerator pedal value is greater than a predetermined threshold, the angle of the ITM value is adjusted in advance by using the accelerator pedal value, to reduce or minimize the differential pressure between the front and rear ends of the ITM valve, but in the case where a driver drives in a downshift manner in a steel plate area, even when the accelerator pedal value is 0%, the RPM rises rapidly.

Accordingly, the apparatus 100 may reduce or minimize the differential pressure between the front and rear ends of the valve before the RPM increases by moving the ITM valve at a specified minimum opening angle and opening it for 5 seconds in advance using the accelerator pedal value and the road slope.

On the other hand, when the road slope is equal to or greater than the predetermined threshold B in step S104, the apparatus 100 determines whether the transmission gear value is smaller than a predetermined threshold C (S107). In this case, the threshold C may be set to, e.g., 5, which is may be predetermined and stored as an experimental value.

When the transmission gear value is greater than the predetermined threshold C, the apparatus 100 performs the PID control of the coolant temperature (S109), and when the transmission gear value is smaller than the predetermined threshold C, the apparatus 100 adjusts the lift value to open the ITM value by a predetermined value F (S108). Then, the apparatus 100 maintains the opening angle of the ITM valve by the predetermined value F for the predetermined G seconds, and then performs the PID control of the coolant temperature (S109). In this case, the threshold F may be set to, e.g., 6 mm, which is may be predetermined and stored as an experimental value.

As such, the apparatus 100 may apply different lift values of the ITM valve depending on the transmission gear value. For example, when the transmission gear value is smaller than 6, the lift value is adjusted to open the ITM valve by 8 mm, and when the transmission gear value is smaller than 5, the lift value is adjusted to open the ITM valve by 6 mm. That is, when the transmission gear value is 5, the angle of the ITM valve is opened more than when the transmission gear value is 4.

As described, the present disclosure controls an opening degree of the ITM valve depending on the coolant temperature, and prevents excessive load from acting on the stem portion of the valve in advance to secure durability, by controlling the operation of the ITM valve using the accelerator pedal value, the road slope, and the transmission gear value.

The above description is merely illustrative of the technical idea of the present disclosure, and those skilled in the art to which the present disclosure pertains may make various modifications and variations without departing from the main characteristics of the present disclosure.

Therefore, the exemplary forms disclosed in the present disclosure are not intended to limit the technical ideas of the present disclosure, but to explain them, and the scope of the technical ideas of the present disclosure is not limited by these exemplary forms. The protection range of the present disclosure should be interpreted by the claims below, and all technical ideas within the equivalent range should be interpreted as being included in the scope of the present disclosure.

What is claimed is:

1. An engine control apparatus for a vehicle, the engine control apparatus comprising:
   an integrated thermal management valve in which opening of a plurality of valves is adjusted by rotation of a cam;
   a storage configured to store an opening degree of the integrated thermal management valve based on a road slope and a transmission gear value; and
   a controller configured to control the opening degree of the integrated thermal management valve by using an engine revolutions per minute (RPM) and an accelerator pedal value,
   wherein when the accelerator pedal value is smaller than a predetermined threshold, the controller is configured to control the opening degree of the integrated thermal management valve based on the road slope and the transmission gear value.

2. The engine control apparatus of claim 1, wherein when a gear value is smaller than a certain value when the vehicle is running under a hill descent control, the controller is configured to control the integrated thermal management valve to be opened at a predetermined angle for a predetermined time.

3. The engine control apparatus of claim 2, wherein the controller is configured to determine whether the transmission gear value is smaller than a predetermined second reference value when the road slope is equal to or greater than a predetermined threshold slope.

4. The engine control apparatus of claim 3, wherein the controller is configured to open the integrated thermal management valve by a second lift value when the transmission gear value is smaller than the predetermined second reference value.

5. The engine control apparatus of claim 4, wherein the controller is configured to set the predetermined second reference value to be smaller than a predetermined first reference value.

6. The engine control apparatus of claim 4, wherein the controller is configured to set the second lift value to be smaller than a first lift value.

7. The engine control apparatus of claim 4, wherein the controller is configured to:
   maintain an open state of the integrated thermal management valve for a predetermined time, and
   control the opening degree of the integrated thermal management valve based on PID (proportional, integral, and differential) based on a coolant temperature when the integrated thermal management valve is opened by a first lift value or a second lift value.

8. The engine control apparatus of claim 1, wherein the controller is configured to determine whether the road slope is smaller than a predetermined threshold slope.

9. The engine control apparatus of claim 8, wherein the controller is configured to determine whether the transmission gear value is smaller than a predetermined first reference value when the road slope is smaller than the predetermined threshold slope.

10. The engine control apparatus of claim 9, wherein the controller is configured to open the integrated thermal management valve by a first lift value when the transmission gear value is smaller than the predetermined first reference value.

11. The engine control apparatus of claim 1, wherein when the accelerator pedal value is greater than the predetermined threshold, the controller is configured to control a radiator valve of the integrated thermal management valve to be fully opened.

12. An engine control method for a vehicle, the engine control method comprising:
   controlling, by a controller, an opening degree of an integrated thermal management valve in which opening of a plurality of valves is adjusted by rotation of a cam by using an engine revolutions per minute (RPM);
   determining, by the controller, whether an accelerator pedal value is greater than a predetermined threshold; and
   controlling, by the controller, the opening degree of the integrated thermal management valve based on a road slope and a transmission gear value when the accelerator pedal value is smaller than or equal to the predetermined threshold.

13. The engine control method of claim 12, further comprising:
   controlling, by the controller, a radiator valve of the integrated thermal management valve to be fully opened when the accelerator pedal value is greater than the predetermined threshold.

14. The engine control method of claim 12, wherein controlling the opening degree of the integrated thermal management valve includes:
   when a gear value is smaller than a certain value when the vehicle is running under a hill descent control, controlling the integrated thermal management valve to be opened at a predetermined angle for a predetermined time.

15. The engine control method of claim 12, wherein controlling the opening degree of the integrated thermal management valve includes:
   when the road slope is smaller than a predetermined threshold slope, determining whether a transmission gear value is smaller than a predetermined first reference value; and
   when the transmission gear value is smaller than the predetermined first reference value, opening the integrated thermal management valve by a first lift value.

16. The engine control method of claim 15, wherein controlling the opening degree of the integrated thermal management valve includes:
   when the road slope is equal to or greater than the predetermined threshold slope, determining whether the transmission gear value is smaller than a predetermined second reference value; and
   when the transmission gear value is smaller than the second reference value, opening the integrated thermal management valve by a second lift value.

17. The engine control method of claim 16, wherein controlling the opening degree of the integrated thermal management valve further include:
   maintaining an open state of the integrated thermal management valve for a predetermined time, and then controlling the opening degree of the integrated thermal management valve based on PID (proportional, integral, and differential) based on a coolant temperature when the integrated thermal management valve is opened by the first or second lift value.

18. The engine control method of claim 16, further comprising:
   setting, by the controller, the second reference value to be smaller than the first reference value and the second lift value to be smaller than the first lift value.

* * * * *